United States Patent [19]

Noiles

[11] 3,803,914
[45] Apr. 16, 1974

[54] FLOW METER FOR PARENTERAL SOLUTIONS

[75] Inventor: Douglas G. Noiles, New Canaan, Conn.

[73] Assignee: United States Surgical Corporation, Baltimore, Md.

[22] Filed: June 9, 1972

[21] Appl. No.: 261,323

[52] U.S. Cl. .............................. 73/209, 128/214 C
[51] Int. Cl. ........................ G01f 1/00, A61m 5/16
[58] Field of Search ...... 73/208, 209, 273; 128/214, 128/DIG. 6, 214 C

[56] References Cited
UNITED STATES PATENTS

| | | | |
|---|---|---|---|
| 2,439,614 | 4/1948 | Schramm | 73/209 X |
| 3,181,358 | 5/1965 | Busillo | 73/209 |
| R26,124 | 12/1966 | Koehn | 73/209 X |
| 1,454,301 | 5/1923 | Van Hise | 73/209 |
| 3,690,312 | 9/1972 | Leibinsohn | 128/214 R X |
| 3,233,457 | 2/1966 | Martinez | 73/209 X |

Primary Examiner—Richard C. Queisser
Assistant Examiner—John P. Beauchamp
Attorney, Agent, or Firm—Fleit, Gipple & Jacobson

[57] ABSTRACT

A flow meter for measuring and indicating the flow rate of a parenteral fluid intravenously fed into a body comprises a transparent plastic cylinder positioned in a transparent plastic tube so that no fluid is allowed to flow around the cylinder. The cylinder is hollowed out in its middle so as to define a measuring chamber having tapered sides, and a small weight is positioned in the measuring chamber. The parenteral fluid is made to flow from the bottom to the top of the meter, through the chamber, and the weight is lifted a distance corresponding to the flow rate of the fluid. A scale associates with the weight so that the flow rate of the fluid may be visually monitored.

15 Claims, 12 Drawing Figures

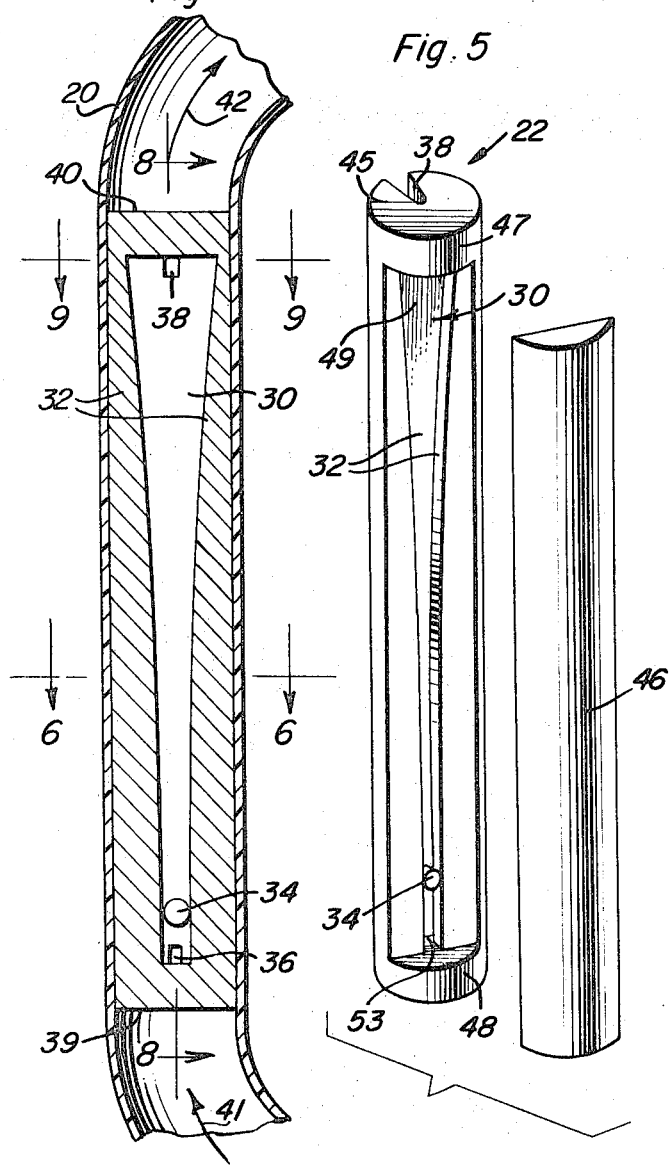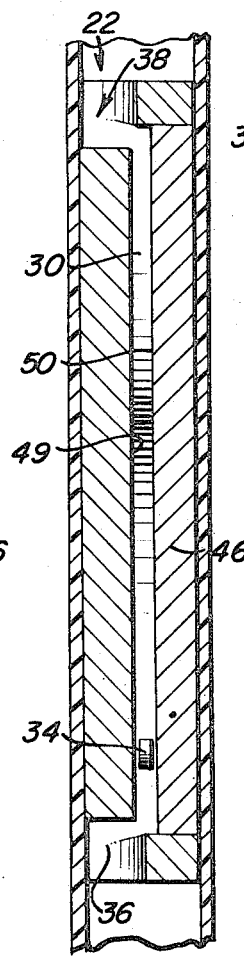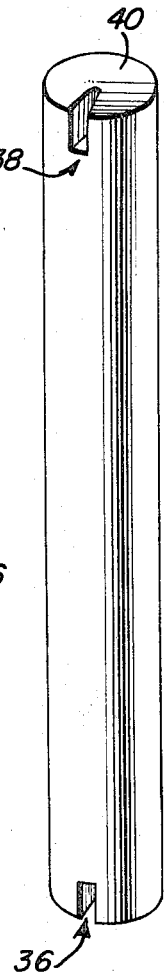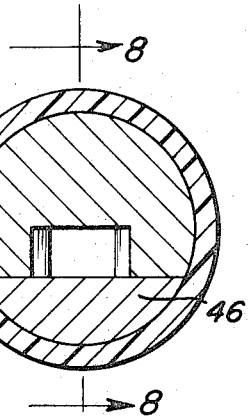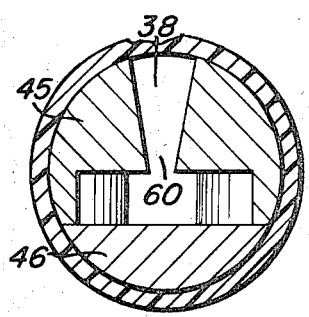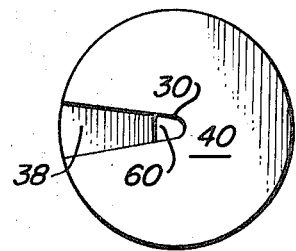

PATENTED APR 16 1974　　3,803,914

FLOW METER FOR PARENTERAL SOLUTIONS

BACKGROUND OF THE INVENTION

The present invention relates to a flow meter for measuring the flow rate of parenteral solutions injected into the body by intravenous feeding techniques.

Medical practitioners have long recognized the necessity for measuring the flow rate of a parenteral solution fed into a human body by intravenous techniques. Traditionally, this has been accomplished by allowing the fluid to fall drop by drop through a drip chamber, which is a tube wider in diameter than the drop, and counting the number of drops falling through the tube over a particular time interval. Such a manual counting system, however, not only requires the attention of additional personnel, but also is relatively inaccurate due to human error. As a result, devices for mechanically measuring the flow rate of these fluids have been developed.

One such device is the subject matter of U.S. Pat. No. 3,587,313, issued to Bob L. Smith, which discloses a flow meter adapted to be connected between a conventional drip chamber and the flexible tube leading to an intravenous needle. The device is composed of three separate plastic parts, which are combined to form a three chambered device, the device being so constructed that the fluid flows downward through a first chamber, upwards through a second chamber and downwards through a third chamber to an exit. The intermediate second chamber is formed with tapered parabolic sides so that the tube has a small diameter at its bottom and a larger diameter at its top. A metal ball or sphere is placed within this intermediate chamber so that fluid flowing upwardly through the chamber carries a ball along with it and thus lifts the ball in an upward direction. Because of the tapered design of the intermediate chamber, the height of the ball indicates the flow rate of the fluid.

While this device provides easy and relatively accurate measurement of the flow rate of an intraveneously fed liquid, it suffers from certain drawbacks in use. Because three separate pieces secured together form the fluid chambers, the device, unless flawlessly constructed, would leak at the various part junctions. This would not only waste some of the parenteral solution but would also decrease the sterility level and coat the outside surfaces of the device with often messy parenteral liquid. To prevent such possible leakage, the manufacturing steps must be very carefully carried out, and the ultimate product must be very carefully inspected. Furthermore, because a cylindrical column with a tapered configuration is needed to measure flow rate, slight imperfections in the tapered column sides significantly affect the accuracy of the device. Finally, and very importantly, because the second or measuring chamber has a tapered and preferably a parabolically tapered configuration, manufacture of the measuring chamber is difficult. In this regard, the only practical method for developing the measuring chamber involves molding plastic material in a mold having a pin or rod with the desired tapered shape located in its center. After the plastic material has hardened, the mold is opened and the pin withdrawn from the hardened plastic mass. Unfortunately, withdrawal of the pin often causes nicks or crevices to form in the tapered surface and thus makes the repeated production of perfectly shaped conduits difficult. Also, the length of the measuring chamber is limited.

Accordingly, it is an object of this invention to provide a leak-proof flow meter for measuring the flow rate of intravenously fed parenteral solutions.

It is another object of this invention to provide a leak-proof flow meter for measuring the flow rate of intravenously fed parenteral solutions with extreme accuracy.

It is still another object of this invention to provide a flow meter as set forth above which can be easily and inexpensively manufactured.

SUMMARY OF THE INVENTION

These and other objects are accomplished according to the present invention wherein a flow meter for the measurement of the flow rate of intravenously fed parenteral solutions is composed of a solid transparent cylinder having a tapered hole therein and a weight adapted to be lifted in the hole by upwardly flowing parenteral solutions. The tapered hole is made so as to taper outwardly from the bottom to the top of the hole, and the weight is shaped so that it substantially conforms in cross section to the cross sectional shape of the hole. Preferably, the hole is bounded by two opposite and parallel planar surfaces, and two opposite surfaces which define the desired taper. The solid cylinder is snugly located in a surrounding flexible transparent tube so that parenteral liquid flows only through the hole in the transparent cylinder. In its preferred embodiment, the transparent cylinder is molded from two cooperating pieces, with each piece defining a longitudinal portion of the tapered hole in the cylinder.

Because the entire measuring device is encompassed within a flexible transparent cylindrical tube, leaks are prevented. And because of the two-piece molded design, manufacturing is facilitated, accuracy is improved, and the versatility of the device is enhanced. Moreover, because, in the preferred embodiment, the tapering of the internal conduit is bonded by two parallel walls, the internal weight is free to laterally move or vibrate in only two directions and hence accuracy is improved.

The present invention also contemplates the provision of a specially adapted mount for the inventive flow meter. Such mount ensures correct positioning of the meter and includes indicia to quickly reflect the rate of flow of the monitored solution.

BRIEF DESCRIPTION OF THE DRAWINGS

The nature of the present invention can be better understood by reference to the following drawings wherein:

FIG. 4 is a view in schematic cross section showing the operation of the metering cylinder of the present invention.

FIG. 5 is an exploded isometric view of the metering cylinder of the inventive flow meter.

FIG. 6 is a cross section through the middle of the inventive flow meter taken on line 6—6 of FIG. 4.

FIG. 7 is a perspective view of the metering cylinder showing the side of the cylinder opposite to that shown in FIG. 5.

FIG. 8 is a cross-sectional view taken along line 8—8 of FIG. 4.

FIG. 9 is a cross-sectional view taken on line 9—9 of FIG. 8.

FIG. 10 is an end view showing the bottom of the device shown in FIG. 8.

DETAILED DESCRIPTION

Figure 1:
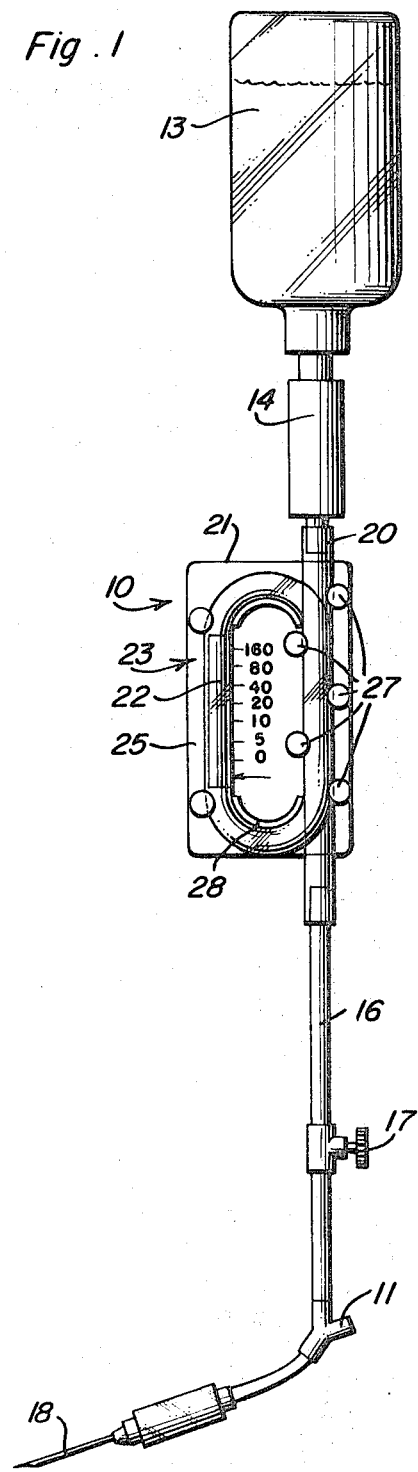
FIG. 1 is a side view of the flow meter and mount according to the present invention incorporated into a conventional intravenous feeding system.

Referring to FIG. 1, the inventive flow meter, generally indicated at 10, is incorporated into a conventional system for the intravenous feeding of a parenteral solution into the body. This system is composed of a conventional container 13 for holding a quantity of parenteral liquid, a drip chamber 14 attached to the container 13 for manual measuring of the liquid flow rate, the inventive flow meter 10, a conventional flexible tube 16, a screw-type flow control valve 17, and a needle 18, positioned downstream of a standard Y-type injection site 11.

Figure 2:
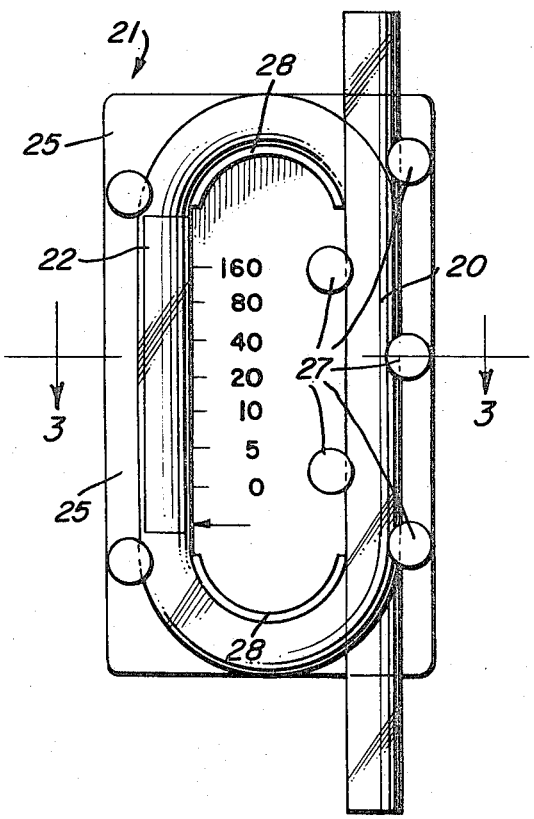
FIG. 2 is a side view of the inventive flow meter and mount illustrating how the parts of the assembly are associated.
Figure 3:
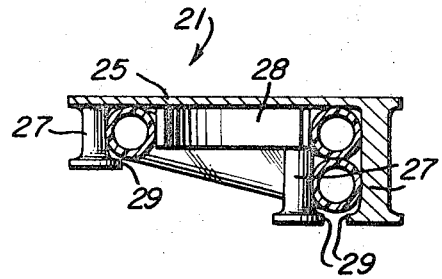
FIG. 3 is a top view of the inventive mount.

The inventive flow meter, generally indicated at 10, is composed of three main components, a flexible hollow transparent tube 20, a tube holder or mount 21 and a metering cylinder 22. As shown in FIGS. 2 and 3, the tube holder 21 is composed basically of a planar piece 25 having a number of raised portions 27 and 28 thereon. Raised portions 27 have nubs or burrs 29 thereon, which are adapted to hold transparent tube 20 firmly against planar piece 25. And as shown best in FIG. 2, one of the raised portions 28 is located in the upper region of planar piece 25 while the other raised portion 28 is located on the lower region.

As shown in FIGS. 1 and 2, flexible transparent tube 20 is placed in the tube holder 21 so that it forms a rectangular loop. When so positioned, the portions of tube 20 located at the top and bottom of the rectangle rest against raised portions 28 of the tube holder 21. Moreover, the portions of tube 20 extending on the sides of the rectangle are held against flat piece 25 by the nubs 29 on the raised portions 27, a double section of tube 20 being held against flat piece 25 on the right side of the rectangular loop shown in FIGS. 1 and 2. As is evident from the figures, the transparent tube 20 is positioned so that a substantially straight section of the tube, generally indicated at 23, has the intravenous parenteral fluid flowing in a generally upward direction when flowing through the measuring device 10.

Located within the section of tube 20 where fluid flows upwardly, or in the area indicated at 23 in FIG. 2, is the flow rate measuring component of the inventive device, metering cylinder 22. As shown in FIG. 4, metering element 22 is generally cylindrical in shape and adapted to securely fit within tube 20 so that no liquid can flow between the sides of metering cylinder 22 and the inner walls of flexible tube 20. Accordingly, all fluid flowing through flexible transparent tube 20 must flow through metering cylinder 22.

As shown in FIG. 4, the metering cylinder 22 contains a measuring chamber 30 therein which has tapered side walls 32. The front and back walls of chamber 30, as can be seen in FIG. 6, are planar and parallel. A cylindrical weight 34 is located in the chamber 30, the diameter of the cylindrical weight 34 being selected so that it is slightly smaller than the distance separating tapered side walls 32 at the lowest portion of measuring chamber 30. Measuring chamber 30 is also provided with an entry hole 36 for inflowing fluid and an exit hole 38 for outflowing fluid. Entry hole 36 is in fluid communication with the lower surface 39 of metering cylinder 22, and exit hole 38 is in fluid communication with upper surface 40 of metering cylinder 22. As a result, fluid flowing in the direction of arrow 41 flows into measuring chamber 30 through entry hole 36 and out of measuring chamber 30 through outflow hole 38 in the direction of arrow 42.

The construction of the metering cylinder 22 can be better understood by reference to FIGS. 5 and 6. As shown in these figures, the metering cylinder is composed of two pieces, main element 45 and closure 46. The main element 45 is cylindrical in configuration, while closure 46 is in the form of a section of a cylinder having the same diameter as main element 45. Moreover, closure 46 is axially shorter than main cylinder 45 so that when positioned to fit together, main cylinder 45 has fully cylindrical sections 47 and 48 extending above and below the bottom of closure 46. As a consequence, these two cylindrical pieces positively align and form a substantially solid cylinder having a number of channels therethrough. And, as can be seen from FIG. 6, one of the channels is measuring channel 30 which is defined on three sides by the two tapered side walls 32 and the planar wall 49 of main cylinder 45 and on its fourth side by the planar surface 50 on one side of closure 46.

Referring now to FIGS. 4, 5 and 6, together, when main cylinder 45 and closure 46 are assembled, the internal chamber 30 is rectangular in cross section and has one pair of flat sides, side 49 and side 50, and a pair of opposing tapered sides 32. Moreover, as shown in FIG. 6, channel 30 lies generally in the center of the cylinder formed by the two pieces 45 and 46.

As set forth above, cylindrical weight 34 is located within chamber 30 and has a diameter slightly smaller than the distance between opposing tapering walls 32 at the bottom of chamber 30. In addition, cylindrical weight 34 has a thickness only slightly smaller than the distance between opposing walls 49 and 50. As a result, liquid flow is restricted to the areas between cylindrical weight 34 and the opposing tapered walls 32, with the flow between weight 34 and the opposing pair of planar walls being substantially prevented.

Already noted above is the manner in which liquid flows through chamber 30 by entering hole 36 and exiting hole 38. The nature of these holes can be more readily understood by reference to FIGS. 5, 7, 8, 9 and 10. As shown in FIG. 5, entry hole 36 communicates with chamber 30 at the bottom of the chamber at the junction of flat wall 49 and chamber bottom 53. Likewise, exit hole 38 communicates with chamber 30 at the top of the chamber at the junction between flat wall 49 and the chamber upper wall. As best illustrated in FIGS. 7 and 10, holes 36 and 38 take the form of wedge shaped notches in main cylinder 45, located at the back end thereof. And as shown in FIG. 8, the notches 36 and 38 extend axially far enough towards the longitudinal center of the cylinder and radially far enough towards the center of the cylinder so that communication is made between the holes and measuring chamber 30. FIG. 9, which is a cross-sectional view taken on line 9—9 of FIG. 8, also shows that connection 60 is made between hole 38 and chamber 30. This design allows the fluid to freely flow into chamber 30 through entry hole 36 and out of chamber 30 through exit hole 38. At the same time, and as can best be seen in FIG. 8, weight 34 is effectively prevented from travelling through either the fluid entry or the fluid exit holes.

In operation, the metering cylinder 22 is assembled in the manner shown in FIG. 5 and is inserted in plastic transparent tube 20. The tube 20 is then positioned in tube holder 21 so that metering cylinder 22 is vertically located at 23 (FIG. 2) and further so that entry hole 36 is in fluid communication with drip chamber 14. Parenteral fluid flows from container 13 into drip chamber 14, and after chamber 14 has been sufficiently filled, it is squeezed to prime the system. Thereafter, the flow rate of the fluid flowing through the system is adjusted by screw flow control valve 17 so that the parenteral fluid flows into the body at the desired rate.

Because the parenteral fluid upwardly flows through measuring chamber 30, it tends to carry cylindrical weight 34 along with it. As a result, the force exerted by the flowing fluid on cylindrical weight 34 tends to lift the weight and maintain it in a particular position at steady state so that the steady state flow rate of the fluid is measured and indicated. In this regard, the face of planar piece 25 of tube holder 21 is provided with suitable indicia, as shown in FIG. 2, to indicate the flow rate of the parental liquid flowing through the device. Moreover, the shape of tapered side walls 32 is selected so that the inventive flow meter gives a predetermined response to a given liquid flow rate and a given flow rate change. Thus, for example, tapered side walls 32 can be made to taper linearly in which case the flow meter gives a linear response to flow rate changes. Alternatively, tapered side walls 32 can be made to taper parabolically in which case the inventive flow meter gives an exponential response to flow rate changes.

Because metering cylinder 22 is incorporated within flexible transparent tube 20, leakage is prevented. Moreover, because in the preferred embodiment, the main measuring chamber 30 has but two tapered surfaces and employs a cylindrically shaped weight, measurement of the fluid flow rate is quite accurate. This is due to the fact that the cylindrical weight 34 is free to move in only two directions, that is back and forth between tapered surfaces 32, rather than in an infinite number of directions as would occur if the chamber were circular in cross section and a spherically shaped weight were used. Finally, because metering cylinder 22 is made from two pieces of material adapted to form a single cylinder, and because one of these pieces forms three sides of the measuring chamber while the other piece forms one side of the chamber, the manufacture of the device is greatly simplified. This is because molding of the main cylinder 45 to contain the simple trough shaped indentation formed by tapered sides 32 and planar side 49 is quite simple. Also, the length of the chamber 30 is relatively unlimited in view of the molding process employed.

Figure 11:
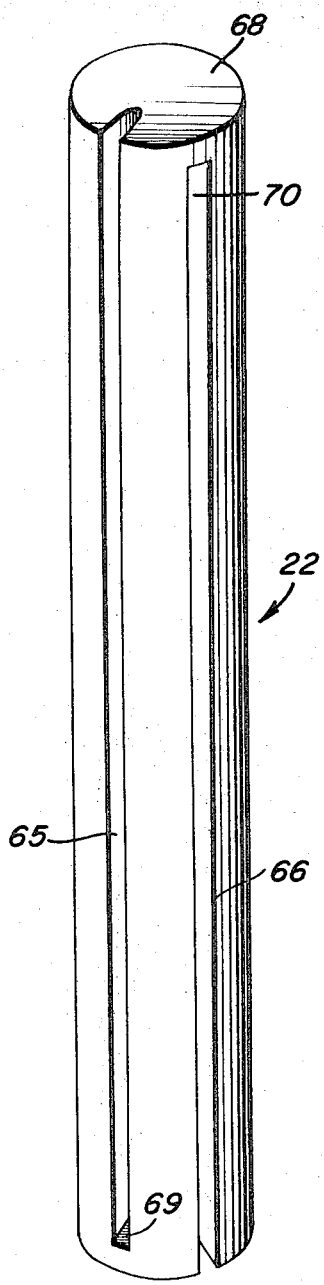
FIG. 11 is an isometric view of the metering cylinder employed in the second embodiment of the invention.
Figure 12:
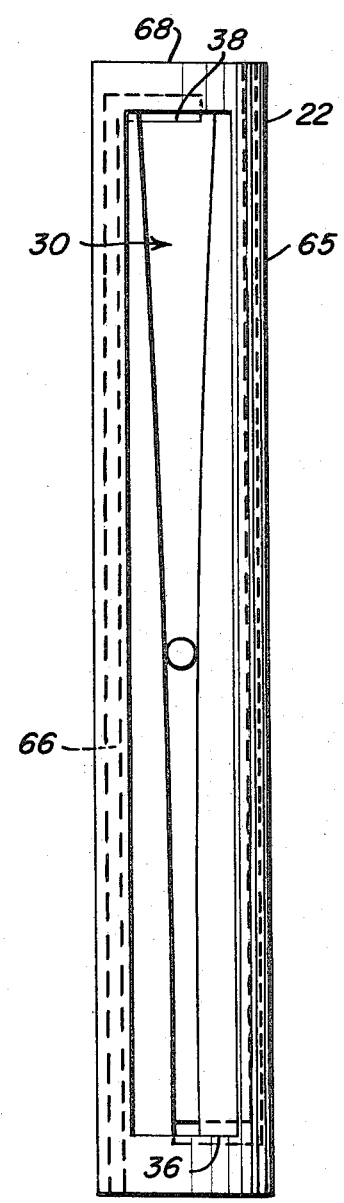
FIG. 12 is a cross-sectional view of the metering cylinder shown in FIG. 11.

A second embodiment of the inventive flow meter is shown in FIGS. 11 and 12. In this embodiment, the circular periphery of the metering cylinder 22 is provided with longitudinal grooves 65 and 66, each extending almost the entire length of the metering cylinder. As can be seen from FIG. 11, one end of groove 65 communicates with the upper surface 68 of the metering cylinder while the other end 69 of the groove is spaced a small distance from the lower end (not shown) of the metering cylinder. Likewise, one end of groove 66 communicates with the lower surface of the metering cylinder, while the other end 70 is spaced a small distance from the metering cylinder upper surface 68. Neither lontitudinal groove communicates with the measuring chamber 30 except at the groove ends, where end 69 of groove 65 communicates with entry hold 36 of measuring chamber 30 and end 70 of groove 66 communicates with exit hole 38 of measuring chamber 30.

As can be seen in FIG. 12, this construction enables the metering cylinder 22 itself to provide the necessary flow path for the parenteral fluid so that it will upwardly flow through measuring chamber 30. As is evident, the advantage of using a metering cylinder of this construction is that looping of the plastic tube 30 is unnecessary and hence the need for tubeholder 21 is eliminated.

While the foregoing invention has been described with reference to particular embodiments, it should be understood that many modifications not specifically set forth can be included within its scope. Thus, in the flow meter shown in FIGS. 1 to 12 any type of tube holding means can be employed so long as it keeps metering cylinder 22 positioned so that fluid flowing through measuring chamber 30 opposes the force of gravity and lifts the weight 34 with respect to the bottom of the chamber. Moreover, it is also within the purview of the present invention to employ a measuring chamber 30 having a circular cross section together with a spherical weight. Although such a construction would give rise to a less accurate flow indication and would make manufacture of the inventive flow meter more difficult, the flow meter would still be substantially leakproof.

It is further contemplated in the invention that the individual sections of metering cylinder 22 not be adapted to fit one inside the other as in the specifically illustrated device. On the contrary, the individual sections of metering cylinder 22 can be of any construction so long as they can be fixedly secured to one another. For example, closure 46 could axially extend as much as the main cylinder 45 with the two pieces being secured together with a boss/notch system or with glue. Moreover, it is also contemplated that the tube sections forming the main measuring device 22 each comprise a fraction, such as a half, of the metering cylinder with each section containing an appropriate indentation to form the proper measuring chamber 30.

It is also contemplated within the scope of the present invention that the parenteral solution be made to flow through the metering chamber from top to bottom instead of from bottom to top as in the specific embodiments of the invention above described. In this situation, the walls of the measuring chamber taper outwardly from top to bottom instead of from bottom to top and in addition the flow indicating weight in the measuring chamber has a density less than the parenteral fluid. In a flow meter of this design, parenteral fluid flowing downwardly through the measuring chamber tends to draw the weight therein downwardly along with it. However, because the weight is less dense than the parenteral fluid, it tends to float and thereby travel in a direction opposite to the direction of the flowing fluid. Because of these phenomena and further because of the shape of the measuring chamber the floating weight maintains a particular height in the measuring chamber in response to the flow rate of the parenteral fluid through the chamber. As in the other embodiments of the invention, housing the metering chamber within a flexible transparent tube prevents leakage, and employing a cylindrically shaped weight and an appropriately shaped chamber improves meter accuracy. In addition, constructing the metering chamber from two molded plastic parts each defining a portion of the measuring chamber along its entire length enables metering cylinders with substantially perfectly formed measuring chambers to be simply and inexpensively produced.

The foregoing description has been presented for illustrative purposes only and is not intended to limit the present invention in any way. All reasonable modifications not specifically set forth are intended to be included within the scope of the present invention, which is to be limited only by the appended claims.

What is claimed is:

1. A meter system for measuring and indicating the flow rate of a fluid flowing through a transparent flexible tube comprising a hollow elongated measuring device having a top and bottom positioned within said flexible tube and in engaging relationship with the walls of the tube so that all fluid flowing through said flexible tube flows through said measuring device, said measuring device having a measuring passage through said measuring device including a portion which tapers outwardly in a longitudinal direction thereof and a weight positioned in said measuring passage adapted to move longitudinally back and forth through said measuring passage in response to the flow rate of the fluid.

2. Apparatus according to claim 1, wherein said measuring device has an inlet flow passage placing the bottom of said measuring passage in fluid communication with the inlet of said flexible tube and an outlet flow passage placing the top of said measuring passage in fluid communication with the outlet of said flexible tube.

3. Apparatus according to claim 2 wherein said measuring passage outwardly tapers from the bottom to the top of said measuring device, and further wherein said weight is more dense than said parenteral fluid.

4. Apparatus according to claim 3 further comprising means positioning said measuring device so that its top is vertically oriented above its bottom.

5. Apparatus according to claim 1 wherein at least one wall of said measuring device is transparent so that said weight can be observed.

6. Apparatus according to claim 1 wherein said measuring passage is rectangular in horizontal cross section and wherein said weight is cylindrical.

7. Apparatus of claim 1 wherein said flexible tube and said measuring device are cylindrical in shape.

8. Apparatus according to claim 1 wherein said measuring device is composed of at least two pieces, each piece defining a longitudinal portion of said measuring passage.

9. Apparatus according to claim 8 wherein said measuring device is cylindrical in shape and wherein said measuring passage is rectangular in horizontal cross section.

10. Apparatus according to claim 8 wherein one piece of said measuring device defines three sides of said measuring passage, and wherein a second piece defines the fourth side of said measuring passage.

11. Apparatus according to claim 10 wherein said measuring passage is rectangular in horizontal cross section and wherein said weight is cylindrical.

12. Apparatus according to claim 8 wherein one piece of said measuring device is provided with means for ensuring that a second piece of said measuring device is in vertical alignment therewith.

13. Apparatus according to claim 12 wherein said one piece is larger than said second piece, and wherein said second piece fits between top and bottom projections extending from said first piece.

14. Apparatus according to claim 1 wherein said device is defined by two separate but associated molded elements each element defining a longitudinal portion of said measuring passage.

15. Apparatus according to claim 1 wherein said flexible tube is part of a system for intravenously feeding a parenteral fluid into the body of a patient.

* * * * *